United States Patent Office 3,200,340
Patented Aug. 10, 1965

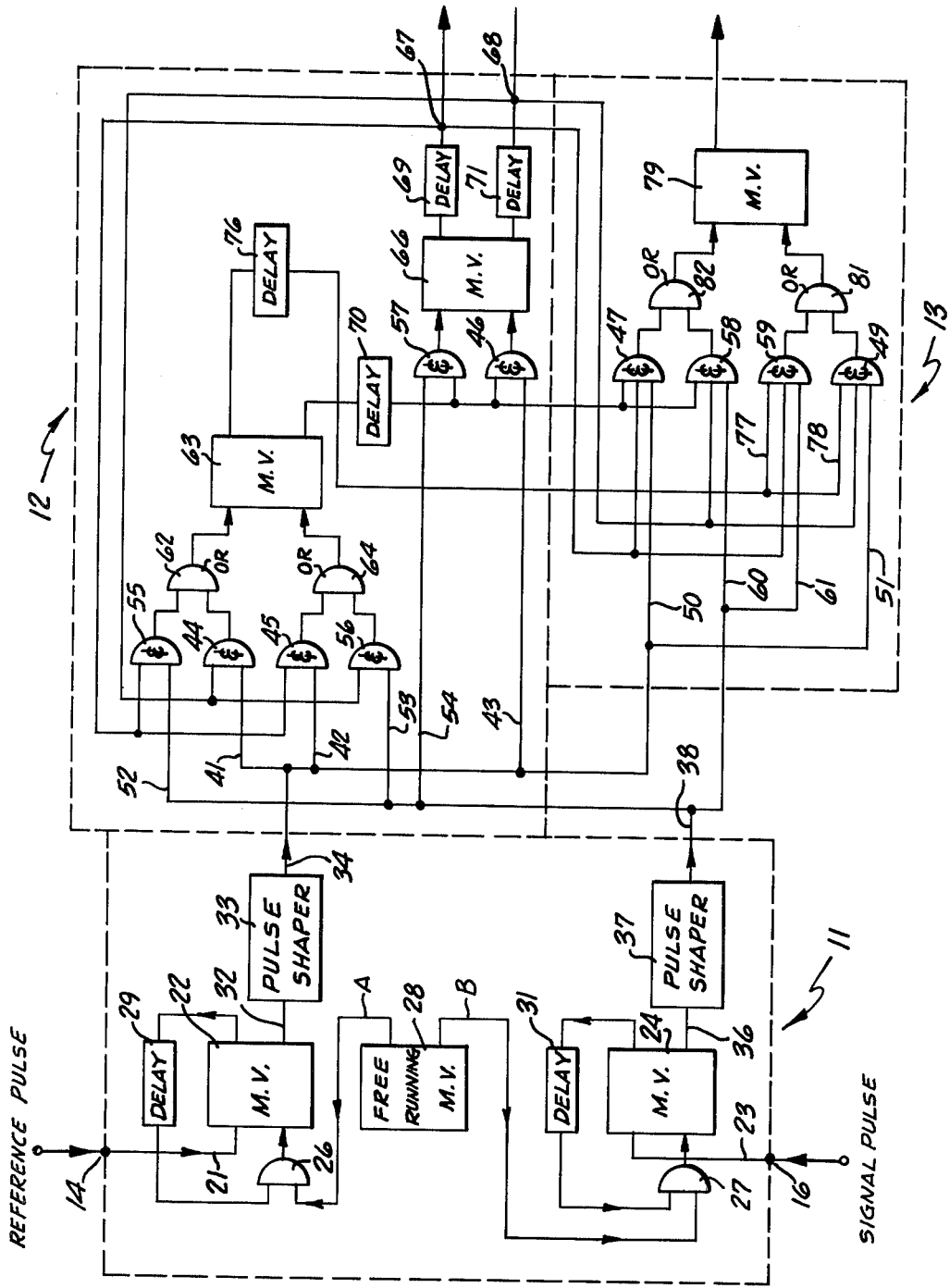

3,200,340
SYNCHRONIZATION MONITOR
Peter F. Dunne, San Francisco, Calif., assignor to Ampex Corporation, Redwood City, Calif., a corporation of California
Filed Nov. 29, 1962, Ser. No. 240,954
5 Claims. (Cl. 328—63)

This invention relates to counter circuitry and in particular to a counter circuit for detecting the relative synchronization between signal and reference information supplied from external sources.

Numerous applications exist today for improved counter circuitry. For example, recent technological advantages have led to much emphasis being placed on the utilization of servo mechanisms and other similar systems wherein it is desirable to synchronize the operation of a controlled unit with respect to a reference unit. These various systems preferably include circuitry which is quick to respond to variations in the desired state of synchronization so that the synchronized state can be re-established rapidly, while at the same time providing an indication of the occurrence of an unstable condition within the system. An example of an improved type of servomechanism system employing such counter circuitry is that disclosed and claimed in copending United States application Serial No. 198,290, which was filed on May 28, 1962.

It is an object of the present invention to provide an improved counter circuit that is capable of detecting a state of synchronization between monitored signal information and reference information.

A further object of the present invention is to provide a counter circuit that is sufficiently versatile so that it may be employed in any number of servomechanisms and other similar closed or open loop systems wherein it is desired to maintain the operation of a controlled element in synchronization with that of a reference.

Still another object of the present invention is to provide a counter circuit that is versatile, reliable in performance, economical in cost and operation and which is designed to effect the maintenance of a synchronous state within a system and to yield an indication of any condition that causes the system to fall out of synchronization.

Other objects and advantages of the present invention will become apparent from the following detailed description thereof when considered in conjunction with the accompanying drawing wherein the sole figure is a logic diagram of a preferred embodiment of the counter circuitry of the present invention.

The illustrated embodiment of the counter circuitry of the present invention is designed so that it may be readily employed in any number of servomechanism systems and the like (i.e., such as that disclosed in the aforementioned copending application). Basically the counter circuitry is designed to effect a comparison between signal information and reference information whereby any deviation in the two results in the generation of output signals that cause the synchronized condition to be re-established and/or yield an indication of the fact that the synchronized state has been disturbed.

In general, the counter circuit includes an input circuit 11, a detecting circuit 12 and an indicating circuit 13. The input circuit 11 receives both the signal and reference information and functions to insure that no input information is lost, and serves to effect the formation of the desired input pulses that are fed to the detecting circuit 12 and to the indicating circuit 13.

The detecting circuit 12 functions in a manner similar to that employed in the aforementioned copending application. In this connection, the detecting circuit includes a pair of bistable multivibrators, the conductive states of which control the production of output signals which are related directly to the synchronous state of the signal information with respect to the reference information. The indicating circuit 13, which also employs a bistable multivibrator circuit, is utilized to yield a signal which is indicative of the synchronized or unsynchronized condition of the counter circuit.

In the drawing, a pair of input terminals 14 and 16 are provided for the input circuit 11 of the counter circuit. Reference pulse information is supplied through the input terminal 14 to the counter circuit at a preselected frequency from an external source of reference information. The terminal 16 is utilized as the input for signal pulse information, the phase and/or frequency of which is to be maintained in one to one synchronization with that of the reference information supplied through the input terminal 14. For example, if the counter circuitry is employed in a servomechanism system, the source of reference information might be an accurately controlled pulse producing source that produces individual pulses at a repetition rate corresponding to the desired operating rate of a motor. In such a case, the signal information source would be the controlled element itself (i.e., the motor) or means monitoring the actual rate at which the motor is operated. Any deviation from one to one synchronization of the reference signal information develops a signal at the output of the detection circuit which influences the motor drive mechanism in such a manner as to minimize the aforesaid deviation.

The input circuit 11 provides a pair of output signals, one of which corresponds to the reference pulse information supplied thereto through the terminal 14 and the other of which corresponds to the signal pulse information supplied thereto through the terminal 16. For purposes of the following description, a condition of synchronization between the reference and signal pulse information is characterized by alternate output signals from the input circuit 11 which corresponds to the reference and signal information. That is, the input circuit 11 will supply an output signal from one of its output terminals to the detecting circuit 12 that corresponds to reference pulse information. The subsequent output signal from the input circuit 11 will correspond to signal pulse information. The successive output pulses, when fed to the detecting circuit 12, maintain the detecting circuit in a state of conduction so that an output signal is derived therefrom which is representative of a synchronous condition.

With reference to the input circuit 11, the input terminal 14 is connected through a conductor 21 to one of the two inputs of a conventional bistable multivibrator 22, the two conductive states of which will be hereinafter referred to as "normal" and alternate." Similarly, the input terminal 16 is connected through a conductor 23 to a conventional bistable multivibrator 24, also having "normal" and "alternate" conductive states as hereinafter described. The second of the inputs to the multivibrators 22 and 24 is provided by "and" gates 26 and 27, respectively. The "and" gates 26 and 27, in turn, have gating information supplied thereto from the complementary outputs of a free running multivibrator 28 and from delay circuits 29 and 31 associated with the multivibrators 22 and 24, respectively.

The "normal" conductive state of the bistable multivibrator 22 is such that a reference information pulse supplied thereto through the input terminal 14 causes it to switch to the "alternate" state of conduction and supply an output signal to the delay circuit 29 and from there to the "and" circuit 26. The duration of the delay of the output signal from the multivibrator 22 is approximately equal to the width of a reference signal, and insures that the multivibrator 22 cannot revert to the "normal" state of conduction until the reference pulse has terminated. The delayed output signal from the multivibrator 22 is fed to the "and" circuit 26, and an output signal from the multivibrator 28 is also fed thereto. In this connection, the free running multivibrator 28 is of a conventional type and is caused to conduct in alternate modes at a repetition rate greater than the anticipated rate of either the applied reference or signal pulse information. In addtion, the multivibrator 28 is caused to supply an output signal to the "and" circuit 26 and the complement voltage level of this signal to "and" circuit 27. The simultaneous presence of enabling output signals from the multivibrator 28 and from the delay circuit 29 opens the "and" gate 26 and triggers the multivibrator 22 back to its "normal" state of conduction. Accordingly, an output signal corresponding to this change back to the "normal" state of conduction is fed through a conductor 32, a conventional pulse shaper 33, and a conductor 34 to the detecting circuit 12 and indicating circuit 13.

The operation of the multivibrator 24 is essentially identical to that of the multivibrator 22. In this connection, a pulse of signal information fed thereto through the input terminal 16 results in the mutlivibrator changing from the "normal" to the "alternate" conductive state and an output signal is produced thereby which is fed to the delay circuit 31 and thereafter to the "and" circuit 27. When a delayed output signal from the bistable multivibrator 24 is present at the "and" circuit 27 concomitantly with an enabling signal from the free running multivibrator 28, the "and" circuit 27 is opened to supply an input signal that drives the multivibrator 24 back into the "normal" state of conduction. Accordingly, a signal is developed at the output of the multivibrator which is fed through a conductor 36, a conventional pulse shaper 37, and a conductor 38 that supplies the detecting circuit 12 and indicating circuit 13.

Summarizing the operation of the input circuit 11, when a reference pulse is fed through the input terminal 14, the bistable multivibrator 22 is caused to shift from the "normal" conductive state to the "alternate" conductive state thereby producing an output signal that is fed to the delay circuit 29. After a suitable delay, this output signal is fed to the "and" gate 26. When the "and" gate 26 receives this output signal and an enabling signal from the free running multivibrator 28, the gate is immediately opened to cause the multivibrator 22 to revert to its "normal" conductive state.

This conditions the multivibrator 22 for a subsequent pulse of reference information supplied thereto through the input terminal 14, and an output pulse corresponding to this re-established "normal" conductive state is fed through the pulse shaper 33 to the detecting and indicating circuits 12 and 13, respectively. However, if the "and" gate 26 is not immediately supplied with an output signal having the appropriate level from the free running multivibrator 28 there is a delay until the multivibrator 28 changes state, at which time the multivibrator 22 will be returned to its "normal" state of conduction. It should be noted that when the output signal of an appropriate level is not supplied by the free running multivibrator 28 to the "and" gate 26, this multivibrator is supplying the gating signal having the necessary level to the "and" gate 27. Accordingly, the "and" gates 26 and 27 can never be opened simultaneously to reset the multivibrators 22 and 24, and output pulses will therefore never be supplied simultaneously by the pulse shapers 33 and 37.

From the foregoing, it can be seen that the delay circuits 29 and 31 perform an important function. That is, if the delay circuits were not present, it would be possible for one of the mutlivibrators 22 and 24 to be repeatedly driven between the "normal" and "alternate" states of conduction during the presence of an input pulse, which is a highly undesirable "race" condition within the input circuit 11. The use of the delay circuits 29 and 31, which delay the output pulses from the multivibrators for a duration of time approximately equal to the width of the triggering pulses, precludes this "race" condition from occurring.

As previously described, a condition of system synchronization is characterized by an equal number of input pulses being alternately and successively supplied at the input terminals 14 and 16. Accordingly, the free running multivibrator 28 must alternate between two conductive states at a repetition rate which is sufficient to open both the "and" gates 26 and 27 within any given pulse period. If the overall system operates on a phase sensing basis (i.e., compares the time interval between pulse arrival at input terminal 14 and the following pulse arrival at input terminal 16 with the time interval between pulse arrival at the input terminal 16 and the following pulse arrival at input terminal 14), then the free running multivibrator 28 preferably shifts between its alternate conductive states at a repetition rate from ten to twenty times that of the pulse rates of the reference and signal information to minimize any delay in forming output pulses at 34 and 38 after input pulses at 14 and 16, respectively.

As shown in the drawing, the signal conductor 34 supplies reference pulses from the pulse shaper 33 through conductors 41, 42 and 43 to conventional "and" circuits 44, 45 and 46 in the detecting circuit 12. In addition, the conductor 34 supplies the shaped reference pulses developed at the output of the input circuit 11 to "and" circuits 47 and 49 in the indicating circuit 13 through conductors 50 and 51. Similarly, the signal pulse developed at the output of the pulse shaper 37 is supplied by the conductor 38 through conductors 52, 53 and 54 to conventional "and" circuits 55, 56 and 57 in the detecting circuit 12. In addition, the conventional "and" circuits 58 and 59 in the indicating circuit 13 are supplied with the signal pulse information through conductors 60 and 61.

With reference to the detecting circuit 12, the "and" circuits 44 and 55 have their outputs connected to an "or" circuit 62, which is connected to one of the inputs of a bistable multivibrator 63. The "and" circuits 45 and 56 supply an "or" circuit 64 which is connected to the other of the dual inputs of the multivibrator 63. The "and" circuits 46 and 57 supply the necessary input signals directly to another conventional bistable multivibrator 66 which supplies the output signals representative of the synchronous state of the reference and signal information.

As hereinafter described, the bistable multivibrator 66, as utilized in the illustrated counter circuit, is designed to switch between two stable modes of operation. That is, the multivibrator 66 functions as a conventional "set-reset" flip-flop circuit, changing from one conductive state to another when pulse information is alternately supplied thereto from the signal information pulse shaper 37 and from the reference signal pulse shaper 33. Accordingly, the output signal from the multivibrator 66, which is supplied through conventional delay circuits 69 and 71 to a pair of output terminals 67 and 68, varies between two distinct voltage levels when the multivibrator 66 alternately shifts between the two stable modes of operation.

The output terminal 67 of the multivibrator 66 not only supplies a delayed output signal to external circuitry utilized with the counter but also supplies a signal to the "and" gates 45 and 55 that, in turn, supply a portion of the input signal to the multivibrator 63. Similarly, the output terminal 68 is connected to the "and" gates 44 and 56 in the input circuit of the multivibrator 63. The multivibrator 63 is electrically connected in the detecting circuit 12 so that one output signal therefrom, when in the "normal" state of conduction, supplies the second input voltage component to the "and" gates 46 and 57 of the multivibrator 66 through a delay circuit 70 to open these gates when input pulses are alternately supplied to the detector 12 from the pulse shapers 33 and 37. The various delay circuits employed in the detecting circuit 12 insure that the output signals fed therethrough are not applied to the other circuit components in time coincidence with the respective input pulses supplied to the detecting circuit from the input circuit.

When the signal information supplied to the input terminal 16 is synchronized with the reference pulse information, pulses are alternately supplied from the pulse shapers 33 and 37 to the detecting circuit 12. Accordingly, when a reference pulse is supplied to the detecting circuit, the simultaneous presence of this pulse and the output signal from the multivibrator 63 at the "and" gate 46 causes the multivibrator 66 to conduct in a first of two conductive states. Output voltages corresponding to this first conductive state are produced at the output terminals 67 and 68.

Assuming that this first conductive state is represented by a "saturated" level of output voltage at 67, the output voltage developed at the terminal 67 when a signal pulse is supplied to the detector 12 from the pulse shaper 37 corresponds to an "off" voltage level (i.e., the second conductive state of the multivibrator 66). As long as this synchronized condition is maintained, the counter circuit output voltages at the terminals 67 and 68 vary between the "off" and "saturated" voltage levels at the repetition rate of the supplied pulses, the level at terminal 68 always being opposite that at terminal 67.

As previously described, the output voltage developed at the terminal 68 of the multivibrator 66 is fed to the "and" gates 44 and 56 in the input circuit of the multivibrator 63. The application of this output voltage to these "and" gates, having been delayed by the conventional delay circuits 71, is supplied to the "and" gates 44 and 56 before the next pulse is supplied to the detecting circuit 12 from the input circuit 11. When the system is in a synchronized state, this subsequent pulse is a signal pulse supplied from the pulse shaper 37 so that the "and" gate 56 is opened and the multivibrator 63 remains in the normal state of conduction.

Should a situation develop whereby the system employing the counter circuit falls out of synchronization, the counter will indicate this condition, as hereinafter described, and subsequent parts of the complete system will immediately rectify the problem. In this connection, should two successive signal pulses, the second of which is the first excess signal pulse, be supplied to the input circuit 11 and, subsequently, to the detecting circuit 12, the normal conductive state of the multivibrator 63 is changed while multivibrator 66 remains unchanged. Furthermore, the normal output voltage from multivibrator 63 that is fed through the delay circuit 70 is not supplied to the "and" gates 46 and 57, and the multivibrator 66 is blocked from shifting between the operational modes as previously described.

More particularly, if the previous pulse supplied to the detector circuit 12 was a signal pulse supplied from the pulse shaper 37, the "and" gates 45 and 55 have delayed voltage levels supplied thereto from the delay circuit 69 that is connected to one output terminal of the multivibrator 66. If the next pulse is also a signal pulse supplied from the pulse shaper 37 rather than a reference pulse supplied from the pulse shaper 33, the "and" gate 56 is blocked but the "and" gate 55 is opened so that the multivibrator 63 is forced to shift to the alternate conductive mode. As a consequence, a "blocking" output voltage is supplied to the "and" gates 46 and 57 from the multivibrator 63, and the ouput voltage from the counter circuitry begins to indicate an error signal, manifested in no voltage change at terminals 67 and 68.

When the unsynchronizing condition is created, the change in the conductive state of the multivibrator 63 results in an output voltage being supplied through a delay circuit 76 and through conductors 77 and 78 to the normally closed "and" gates 49 and 57 associated with one of the inputs to a bistable multivibrator 79. As shown in the drawing, the normally closed "and" gates 49 and 59 are connected through an "or" gate 81 that is connected to the input of the multivibrator 79. The multivibrator 79 is normally maintained in a single state of conduction as a result of the supply of an input signal thereto through an "or" gate 82 which is supplied alternately with input signals from the "and" gates 47 and 58.

When the system is in a synchronized state the normal output from the multivibrator 63 which is fed through the delay circuit 70 also supplies an enabling pulse of appropriate level to the "and" gates 47 and 58 so that the gates 47 and 58 alternately pass reference and signal pulses, respectively, and thereby sustain the multivibrator 79 in its normal state of conduction. As a consequence, the synchronized condition of the system is characterized by a continuous output signal from the multivibrator 79. However, when the normal conductive state of the multivibrator 63 is altered as previously described, and multivibrator 66 remains in the state set by the last nomal signal pulse, the gates 47 and 58 are blocked and gate 59 is enabled to trigger multivibrator 79 should the second excess signal pulse be supplied from the pulse shaper 37. When the aforesaid occurs, the conductive state of the multivibrator 79 is changed with the result that the normal output signal therefrom is cut off thereby yielding an indication that the signal pulse information is no longer synchronized with the reference pulse information. More particularly, when an excess of two (need not be consecutive) signal pulses are fed to the detector as described above, the presence of an output signal from the delay circuit 69, the delay circuit 76, and the signal from the pulse shaper 37 will cause the "and" gate 59 to open, thereby supplying the necessary signal to the multivibrator 79 to cause a variation from its normal conductive state.

In order to re-establish the synchronized condition of the system, the input circuit must be made to supply two reference pulses in succession. This indicates that the signal source is indeed operating at very nearly the correct rate having in fact passed through the correct synchronized rate. The reference pulses now indicate that the existing system error has been corrected in response to the sustained, signal levels of output voltage developed at the output terminals 67 and 68. In this condition, the maximum possible deviation between the signal and reference pulse information is quite small and the counter circuitry immediately responds to effect the necessary correction in the system.

More particularly, as the constant level of output voltage from the detector circuit 12 is applied to other responsive components with the system wherein the counter circuitry is employed, adjustment in the system operation is effected to compensate for the unsynchronized condition. For example, the constant output voltage level might result in a controlled motor being slowed down so that the signal and reference pulses are again synchronized. As the system is brought back into synchronization, a condition will be reached whereat the pulse shaper 33 provides two successive pulses to the detector circuit 12 and indicating circuit 13. When this occurs, the normal conductive state of the multivibrator 63 will be re-established as will that of the multivibrator 79 in the indicating circuit 13. As a consequence, the delay circuit 70 in the output of the multivibrator 63 will again supply the necessary signals to the "and" gates 46 and 57 so that the multivibrator 66 alternately conducts to produce the controlled output voltage for the system. Similarly, the "and" gates 47 and 58 will be alternately opened with each alternate reference and signal pulse and the normal state of conduction of the multivibrator 79 will be sustained thereby yielding a signal of system synchronization.

What is claimed is:

1. A counter circuit for monitoring the synchronization of signal information with respect to reference information, comprising:

an input circuit having a reference pulse input terminal and a signal pulse input terminal for receiving respectively reference pulse information and signal pulse information, and first and second output terminals, said input circuit forming signal output pulses at a first of said output terminals in response to signal information supplied to said signal pulse input terminal and reference output pulses at the second of said output terminals in response to reference information supplied to said reference pulse input terminal, said reference output pulses and signal output pulses being alternately produced at said first and second output terminals of said input circuit when said signal information is synchronized with said reference information; and a detecting circuit electrically connected to said first and said second output terminals of said input circuit for receiving the reference output pulses and signal output pulses formed by said input circuit; said detecting circuit including a first control means having first and second input terminals coupled to said first and second output terminals respectively, said first control means having a third output terminal and normally alternating between two modes of conduction in response to output pulses produced alternately on said first and second output terminals and producing output pulses on said third output terminal; and a second control means having third and fourth input terminals coupled to said first and second output terminals respectively, said second control means having a fourth output terminal coupled to said first and second input terminals of said first control means, said second control means having two modes of conduction but being normally maintained in a single mode of conduction so that said first control means is caused to alternately shift between the two conductive modes by alternate output pulses from said input circuit along with the output from said second control means when in said normal mode of conduction.

2. A counter circuit for monitoring the synchronization of signal information with respect to reference information, comprising:

an input circuit having a reference pulse input terminal and a signal pulse input terminal, for receiving respectively reference pulse information and signal pulse information and first and second output terminals, said input circuit forming signal output pulses at a first of said output terminals in response to signal information supplied to said signal pulse input terminal and reference output pulses at the second of said output terminals in response to reference information supplied to said reference pulse input terminal, said output pulses being alternately produced at said first and second output terminals of said input circuit when said signal information is synchronized with said reference information;

a detecting circuit electrically connected to said first and said second output terminals of said input circuit for receiving the reference output pulses and signal output pulses formed by said input circuit; said detecting circuit including a first control means having first and second input terminals coupled to said first and second output terminals respectively, said first control means having a third output terminal and normally alternating between two modes of conduction in response to output pulses produced alternately on said first and second output terminals and producing output pulses on said third output terminal and a second control means having third and fourth input terminals coupled to said first and second output terminals respectively, said second control means having a fourth output terminal coupled to said first and second input terminals of said first control means, said second control means having two modes of conduction but being normally maintained in a single mode of conduction so that said first control means is caused to alternately shift between the two conductive modes by alternate output pulses from said input circuit along with the output from said second control means when in said normal mode of conduction; and an indicating circuit connected to said first and second output terminals of said input circuit for receiving the output pulses therefrom and to the output terminals of said first control means and said second control means of said detecting circuit for producing an output signal when said first control means within said detecting circuit is alternating between the two modes of conduction thereby yielding an indication of synchronization between said signal and reference information.

3. A counter circuit for monitoring the synchronization of signal information with respect to reference information, comprising:

a first control means capable of operating in one of two modes of conduction and having an input and an output;

input circuit means having first and second output terminals connected to the input circuit of said first control means for supplying reference and signal information pulses to the input of said first control means, said reference and signal pulses being alternately supplied to said input circuit means when in a state of synchronization;

a second control means capable of operating in one of two modes of conduction and having an input and an output;

said input of said second control means being connected to said first and second output terminals of said input circuit means for receiving reference and signal information pulses concomitantly with the supply of reference and signal information pulses to the input of said first control means and being connected to the output of said first control means; said second control means being normally maintained in one of its two modes of conduction by the output from said first control means when said signal information is synchronized with said reference information and having the output thereof connected to the input of said first control means so that said first control means is caused to alternately shift between two conductive modes when reference and signal information pulses are alternately supplied thereto along with the output from said second control means when in said normal mode of conduction, the output from said first control means representing synchronization of said reference and signal information when alternating between the two conductive modes.

4. A counter circuit for monitoring the synchronization of signal information with respect to reference information, comprising:

an input circuit having a reference pulse input terminal and a signal pulse input terminal, for receiving respectively reference pulse information and signal pulse information and first and second output terminals, said input circuit forming signal output pulses at a first of said output terminals in response to signal information supplied to said signal pulse input terminal and reference output pulses at the second of said output terminals in response to reference information supplied to said reference pulse input terminal, said output pulses being alternately produced at said first and second output terminals of said input circuit when said signal information is synchronized with said reference information; and a detecting circuit connected to said first and said second output terminals of said input circuit for receiving the pulses formed by said input circuit; said detecting circuit including a first bistable multivibrator having first and second input terminals coupled to said first and second output terminals respectively, of said input circuit, said first bistable multivibrator having a third output terminal and normally alternating between two stable modes of conduction in response to output pulses produced alternately on said first and second output terminals and producing output pulses on said third output terminal; and a second bistable multivibrator normally maintained in a single mode of conduction, said second bistable multivibrator having third and fourth input terminals coupled to said first and second output terminals respectively of said input circuit, said second bistable multivibrator having a fourth output terminal coupled to said first and second input terminals of said first bistable multivibrator so that said first bistable multivibrator is caused to alternately shift between the two conductive modes by the alternate output pulses from said input circuit along with the output from said second multivibrator when in said normal mode of conduction.

5. A counter circuit for monitoring the synchronization of signal information with respect to reference information, comprising:

an input circuit having a reference pulse input terminal and a signal pulse input terminal, for receiving respectively reference pulse information and signal pulse information and first and second output terminals, said input circuit forming signal output pulses at a first of said output terminals in response to signal information supplied to said signal pulse input terminal and reference output pulses at the second of said output terminals in response to reference information supplied to said reference pulse input terminal, said output pulses being alternately produced at said first and second output terminals of said input circuit when said signal information is synchronized with said reference information;

a detecting circuit connected to said first and said second output terminals of said input circuit for receiving the pulses formed by said input circuit; said detecting circuit including a first bistable multivibrator having first and second input terminals coupled to said first and second output terminals respectively of said input circuit, said first bistable multivibrator having a third output terminal and normally alternating between two stable modes of conduction in response to output pulses produced alternately on said first and second output terminals and producing output pulses on said third output terminal; and a second multivibrator normally maintained in a single mode of conduction, said second multivibrator having third and fourth input terminals coupled to said first and second output terminals respectively of said input circuit, said second bistable multivibrator having a fourth output terminal coupled to said first and second input terminals of said first bistable multivibrator so that said first bistable multivibrator is caused to alternately shift between the two conductive modes by the alternate output pulses from said input circuit along with the output from said second multivibrator when in said normal mode of conduction; and an indicating circuit connected to said first and second output terminals of said input circuit for receiving the output pulses therefrom and to the outputs of said first and second multivibrators of said detecting circuit for producing an output signal when said first bistable multivibrator is alternating between the two modes of conduction thereby yielding an indication of synchronization between said signal and reference information.

References Cited by the Examiner
UNITED STATES PATENTS
3,110,866  11/63  Maure et al. _____ 328—110

ARTHUR GAUSS, *Primary Examiner.*
JOHN W. HUCKERT, *Examiner.*